United States Patent
Jena et al.

(10) Patent No.: US 10,860,186 B2
(45) Date of Patent: Dec. 8, 2020

(54) USER INTERFACE COMPONENT WIRING FOR A WEB PORTAL

(71) Applicant: Oracle International Corporation, Redwood Shores, CA (US)

(72) Inventors: Somyajit Jena, Redwood Shores, CA (US); Stephen Burns, Palo Alto, CA (US); Ross Clewley, Swindon (GB)

(73) Assignee: Oracle International Corporation, Redwood Shores, CA (US)

( * ) Notice: Subject to any disclaimer, the term of this patent is extended or adjusted under 35 U.S.C. 154(b) by 330 days.

(21) Appl. No.: 14/749,792

(22) Filed: Jun. 25, 2015

(65) Prior Publication Data

US 2016/0092415 A1    Mar. 31, 2016

Related U.S. Application Data

(60) Provisional application No. 62/055,871, filed on Sep. 26, 2014.

(51) Int. Cl.
| | |
|---|---|
| *G06F 17/22* | (2006.01) |
| *G06F 3/0484* | (2013.01) |
| *H04L 29/08* | (2006.01) |
| *G06F 16/954* | (2019.01) |

(52) U.S. Cl.
CPC ........ *G06F 3/04842* (2013.01); *G06F 16/954* (2019.01); *H04L 67/02* (2013.01)

(58) Field of Classification Search
CPC . G06F 3/04842; G06F 17/30873; H04L 67/02
See application file for complete search history.

(56) References Cited

U.S. PATENT DOCUMENTS

| | | | | |
|---|---|---|---|---|
| 7,127,473 | B2 * | 10/2006 | Agassi | G06F 17/30867 |
| 7,331,049 | B1 * | 2/2008 | Jin | G06Q 10/107 |
| | | | | 709/201 |
| 7,574,712 | B2 * | 8/2009 | Allamaraju | G06Q 30/00 |
| | | | | 705/51 |
| 7,668,864 | B2 * | 2/2010 | Benson | G06Q 10/10 |
| | | | | 707/608 |
| 7,779,017 | B2 * | 8/2010 | Haselden | G06F 9/4494 |
| | | | | 707/756 |
| 7,779,043 | B2 * | 8/2010 | Jezierski | G06F 8/24 |
| | | | | 707/802 |

(Continued)

OTHER PUBLICATIONS

Oracle WebCenter Portal (http://docs.oracle.com/cd/E36909_01/webcenter.1111/e10148.pdf; pub date: Apr. 2013; last accessed May 30, 2017).*

(Continued)

*Primary Examiner* — Jung-Mu T Chuang
(74) *Attorney, Agent, or Firm* — Potomac Law Group, PLLC

(57) ABSTRACT

A system that generates a portal web site that includes a plurality of reusable components defines, for each reusable component, metadata for each event raised and generates event wiring for the portal web site. In response to an event being raised by a producer component, the system makes the event available to all consumer components on the portal web site by generating an event context storage. The system then configures each consumer component based on the event.

18 Claims, 7 Drawing Sheets

(56) References Cited

U.S. PATENT DOCUMENTS

| | | | | |
|---|---|---|---|---|
| 7,788,340 | B2* | 8/2010 | Jolley | G06F 9/4443 709/203 |
| 7,827,494 | B1* | 11/2010 | Hedayatpour | G06F 8/38 709/203 |
| 7,831,670 | B2* | 11/2010 | Goodman | H04L 67/02 709/206 |
| 7,844,582 | B1* | 11/2010 | Arbilla | G06F 21/554 707/694 |
| 7,890,572 | B2* | 2/2011 | Goodman | G06Q 10/107 709/203 |
| 8,863,126 | B2* | 10/2014 | Poore | G06F 8/00 717/118 |
| 8,978,023 | B2* | 3/2015 | Poore | G06F 8/00 717/115 |
| 9,269,061 | B2* | 2/2016 | Jeyapaul | G06F 21/604 |
| 9,465,880 | B2* | 10/2016 | Gray-Donald | G06F 16/958 |
| 9,485,300 | B2* | 11/2016 | Feng | H04L 29/0809 |
| 2004/0028212 | A1* | 2/2004 | Lok | G06F 17/30873 379/265.09 |
| 2004/0143597 | A1* | 7/2004 | Benson | G06Q 10/10 |
| 2004/0220921 | A1* | 11/2004 | Billock | G06F 16/00 |
| 2005/0050021 | A1* | 3/2005 | Timmons | G06F 17/30899 |
| 2005/0229159 | A1* | 10/2005 | Haba | G06F 11/368 717/122 |
| 2006/0069920 | A1* | 3/2006 | Jolley | G06F 17/3089 713/182 |
| 2006/0136587 | A1* | 6/2006 | Allamaraju | G06Q 30/02 709/224 |
| 2006/0136588 | A1* | 6/2006 | Allamaraju | G06Q 30/00 709/224 |
| 2006/0218000 | A1* | 9/2006 | Smith | G06Q 10/00 709/204 |
| 2007/0040094 | A1* | 2/2007 | Smith | G06F 17/18 250/202 |
| 2007/0083551 | A1* | 4/2007 | Jezierski | G06F 8/24 |
| 2007/0136236 | A1* | 6/2007 | Kussmaul | G06F 17/3089 |
| 2007/0162444 | A1* | 7/2007 | Haselden | G06F 9/4494 |
| 2007/0250487 | A1* | 10/2007 | Reuther | G06F 16/367 |
| 2007/0288520 | A1* | 12/2007 | Hatanaka | G06Q 10/06 |
| 2008/0021918 | A1* | 1/2008 | Rao | G06F 17/3089 |
| 2008/0028098 | A1* | 1/2008 | Jeng | H04L 12/40 709/238 |
| 2008/0065608 | A1* | 3/2008 | Liesche | G06F 17/3089 |
| 2008/0168122 | A1* | 7/2008 | Fletcher | H04L 51/18 709/201 |
| 2008/0243532 | A1* | 10/2008 | Leach | G06Q 30/02 705/1.1 |
| 2008/0263216 | A1* | 10/2008 | Jacob | G06F 17/30887 709/229 |
| 2009/0006184 | A1* | 1/2009 | Leach | G06Q 10/101 705/7.32 |
| 2009/0037024 | A1* | 2/2009 | Jamieson | G05B 19/00 700/264 |
| 2009/0089078 | A1* | 4/2009 | Bursey | G06Q 10/101 705/300 |
| 2009/0100372 | A1* | 4/2009 | Lauridsen | G06F 17/30873 715/781 |
| 2009/0187919 | A1* | 7/2009 | Maes | H04L 65/1016 719/313 |
| 2010/0083369 | A1* | 4/2010 | Shmuylovich | H04L 9/0894 726/18 |
| 2011/0145399 | A1* | 6/2011 | Jeyapaul | G06F 21/604 709/224 |
| 2011/0225232 | A1* | 9/2011 | Casalaina | G06F 3/0481 709/203 |
| 2011/0228984 | A1* | 9/2011 | Papke | G06K 9/00771 382/103 |
| 2011/0252334 | A1* | 10/2011 | Verma | G06Q 30/06 715/744 |
| 2012/0023544 | A1* | 1/2012 | Li | G06Q 30/06 726/1 |
| 2012/0151568 | A1* | 6/2012 | Pieczul | H04L 63/0815 726/8 |
| 2013/0173720 | A1* | 7/2013 | Vasudev | H04L 51/18 709/206 |
| 2013/0174154 | A1* | 7/2013 | Poore | G06F 8/00 718/1 |
| 2013/0232509 | A1* | 9/2013 | Allen | G06F 9/542 719/318 |
| 2013/0326046 | A1* | 12/2013 | Chan | G06F 9/4443 709/224 |
| 2013/0346873 | A1* | 12/2013 | Vasudev | G06F 40/14 715/738 |
| 2014/0032597 | A1* | 1/2014 | Ellis | G06F 16/95 707/770 |
| 2014/0032713 | A1* | 1/2014 | Phan | H04L 67/16 709/217 |
| 2014/0033076 | A1* | 1/2014 | Al-Alami | G06F 3/0483 715/753 |
| 2014/0215307 | A1* | 7/2014 | Schneider | G06F 17/30893 715/234 |
| 2014/0229619 | A1* | 8/2014 | Han | H04L 67/02 709/225 |
| 2014/0307863 | A1* | 10/2014 | Snyder | H04M 3/42068 379/265.09 |
| 2014/0310608 | A1* | 10/2014 | Snyder | G06Q 10/109 715/738 |
| 2014/0330956 | A1* | 11/2014 | Telfer | H04L 43/04 709/224 |
| 2014/0344314 | A1* | 11/2014 | Gray-Donald | G06F 16/23 707/821 |
| 2015/0007006 | A1* | 1/2015 | Kaminsky | G06F 17/3089 715/205 |
| 2015/0035644 | A1* | 2/2015 | June | G07C 11/00 340/5.61 |
| 2015/0350605 | A1* | 12/2015 | Price | G16H 10/65 348/77 |
| 2016/0105370 | A1* | 4/2016 | Mellor | H04L 45/02 709/226 |
| 2016/0277577 | A1* | 9/2016 | Yentis | G10L 21/12 |
| 2018/0113658 | A1* | 4/2018 | Sikkink | G06F 3/1204 |

OTHER PUBLICATIONS

Fusion Developer's Guide for Oracle Application Development Framework (https://docs.oracle.com/cd/E26098_01/web.1112/e16182.pdf; pub date: Apr. 2012; last accessed May 30, 2017).*

"WSRP Architecture"; http://portals.apache.org/wsrp4j/arch/; last downloaded on Apr. 5, 2015.

Wikipedia, the free encyclopedia; "Web Services for Remote Portlets"; https://en.wikipedia.org/wiki/Web_Services_for_Remote_Portlets; last downloaded on Apr. 5, 2015.

* cited by examiner

USER INTERFACE COMPONENT WIRING FOR A WEB PORTAL

CROSS REFERENCE TO RELATED APPLICATIONS

This application claims priority of Provisional Patent Application Ser. No. 62/055,871, filed on Sep. 26, 2014, the contents of which is hereby incorporated by reference.

FIELD

One embodiment is directed generally to a computer system, and in particular to a computer system that generates a portal web site.

BACKGROUND INFORMATION

Generally, a web site is an arrangement of content, such as text, images, and sound, on a set of web pages configured for presentation over a computer network in a predetermined way. The content appearing on a web page is generally stored in a centralized location, such as a database or a set of files, that is local to a web server. Requests for web pages, which are typically transmitted by web browsers via the Hypertext Transfer Protocol ("HTTP") protocol, are processed by the web server. Centralizing the storage of the content found on web pages facilitates its transmission by the web server because the web content is in a known location that is readily available.

Web sites have become more complex as their application has spread. Web sites have proven to be a valuable means of communication both with the public (e.g., a corporate web site) and in private use (i.e., an Intranet site). In either case, it is advantageous to display content with as much breadth and depth as possible to maximize the utility of the web site to its users. However, as web content becomes more complex and diverse, the amount of time, money and effort in obtaining, storing and updating the web content has increased.

More recently, portal web sites, or "web portals", have been used to deliver complex and diverse content over a computer network. A web portal is a web site containing one or more portlets displayed on a web page. A portlet is a configurable content area displayable on a web page that provides content or performs one or more associated functions, or both. Portlets may display content that is obtained from a source remote from the web server. For example, a portal web site may use an arrangement of portlets to display web content on different subject areas. A portlet can be considered any reusable component that complies with the portlet standard. The web content for each of the subject areas need not be stored centrally to the web server, but instead may be stored in a plurality of locations geographically removed, but accessible to the portal web server. A portlet may be configured such that it may display the information it obtains to the web browser in a customized manner.

SUMMARY

One embodiment is a system that generates a portal web site that includes a plurality of reusable components. The system defines, for each reusable component, metadata for each event raised and generates event wiring for the portal web site. In response to an event being raised by a producer component, the system makes the event available to all consumer components on the portal web site by generating an event context storage. The system then configures each consumer component based on the event.

DETAILED DESCRIPTION

Embodiments provide wiring events between different type of components in a web portal by establishing metadata for events published and received. The events are stored in a central event context and made available to all consumer components that are configured to receive the events, regardless of the type of component. In one embodiment, the events are described using an expression language ("EL") expression.

Figure 1:
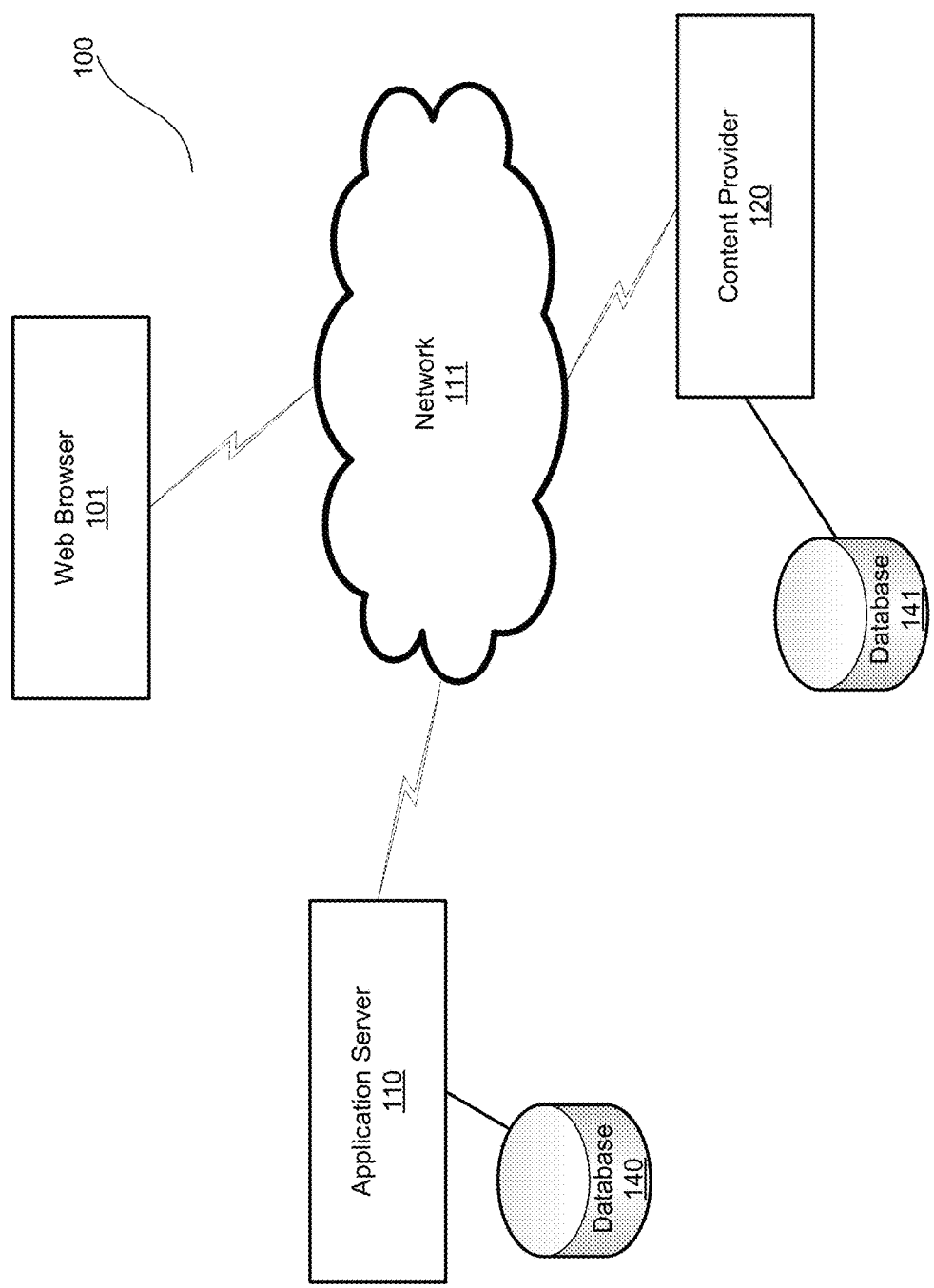
FIG. 1 is an overview diagram of a portal management system including network elements that implement embodiments of the present invention and/or interact with embodiments of the present invention.

FIG. 1 is an overview diagram of a portal management system 100 including network elements that implement embodiments of the present invention and/or interact with embodiments of the present invention. Portal management system 100 allows a user to manage the appearance and operation of a web site and the content appearing on the web site. Portal management system 100 includes a web browser 101, an application/web server 110, databases 140, 141, and a content provider 120.

A web browser 101 is any device capable of browsing content over a computer network 111, such as the Internet, and is operatively connected to application server 110. While only one web browser 101 is shown in FIG. 1, multiple web browsers 101 may be operatively connected to application server 110. Web browser 101 and application server 110 may communicate over computer network 111 using well-known communication protocols, such as Transmission Control Protocol ("TCP") and Internet Protocol ("IP"), or TCP/IP, HTTP and Extensible Markup Language ("XML").

In one embodiment, application server 110 is a well-known component that assembles and serves web pages to one or more web browsers 101. Application server 110 in one embodiment functions as an underneath middleware framework, and further includes applications such as Java 2 Platform, Enterprise Edition ("J2EE") applications. As such, application server 110 may serve web pages containing one or more portlets. A portlet is a configurable content area displayable on a web page that displays content obtained from a source remotely to the web server, or performs one or more functions remotely to the web server. A portlet may be configured such that it may display customized information to a user. A portlet can be considered any reusable component that complies with the portlet standard (i.e., the Java Portlet Specification 2.0 (JSR 286)). In one embodiment, Application Development Framework ("ADF") task flows are considered portlets.

A content provider 120 is a functional component that provides content for a portlet in response to requests from application server 110. Content provider 120 in one embodiment is software operating on a separate hardware device other than that executing application server 110. System 100 may include more than one content provider 120. In other embodiments, the functionality of content provider 120 and application server 110 can be implemented on the same network element. In some embodiments, content provider 120 may be implemented using a cross-platform component architecture such as the JavaBean architecture. Such an embodiment is advantageous when deploying content providers 120 over multiple platforms.

Application server 110 assembles the requested web page using any content received from content provider 120 and data stored in an associated central repository concerning the organization and presentation of the web page. In one embodiment, the data stored in the central repository that application server 110 uses in assembling the requested web page includes data concerning the following attributes of the web page: style, layout, content resident thereon, portlets displayed thereon, items displayed thereon, groups, folders and user permissions for the web page. In other words, application server 110 manages data concerning the appearance and operation of portal web sites in a central repository, such as a database, and uses that information to assemble the web page, along with content received from content providers 120. The data application server 110 uses in rendering web pages may be directed towards visual aspects of the page (e.g., style or layout information), or it may be directed towards operational aspects of the page (e.g., what portlets are displayed, permissions regarding access to portions of the web page, etc.). In embodiments of the invention, web pages are dynamically generated based upon data stored in tables in a database, including databases 140, 141.

Figure 2:
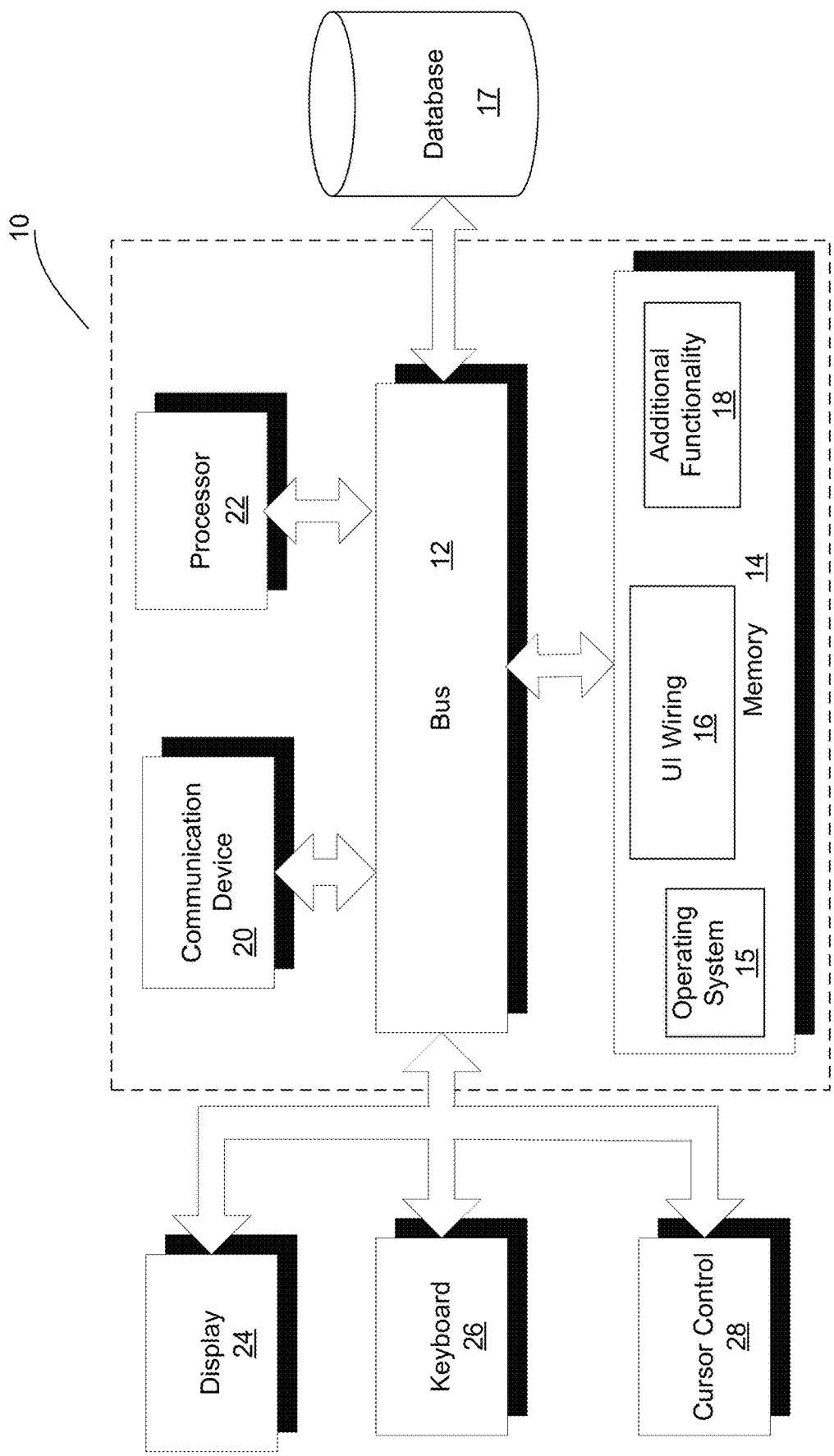
FIG. 2 is a block diagram of a computer server/system in accordance with an embodiment of the present invention.

FIG. 2 is a block diagram of a computer server/system 10 in accordance with an embodiment of the present invention. System 10 can be used to implement any of the network elements shown in FIG. 1 as necessary in order to implement any of the functionality of embodiments of the invention disclosed in detail below. Although shown as a single system, the functionality of system 10 can be implemented as a distributed system. Further, the functionality disclosed herein can be implemented on separate servers or devices that may be coupled together over a network. Further, one or more components of system 10 may not be included. For example, for functionality of application server 110, system 10 may be a server that in general has no need for a display 24 or one or more other components shown in FIG. 2.

System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network, or any other method.

Computer readable media may be any available media that can be accessed by processor 22 and includes both volatile and nonvolatile media, removable and non-removable media, and communication media. Communication media may include computer readable instructions, data structures, program modules, or other data in a modulated data signal such as a carrier wave or other transport mechanism, and includes any information delivery media.

Processor 22 may further be coupled via bus 12 to a display 24, such as a Liquid Crystal Display ("LCD"). A keyboard 26 and a cursor control device 28, such as a computer mouse, may further be coupled to bus 12 to enable a user to interface with system 10 on an as needed basis.

In one embodiment, memory 14 stores software modules that provide functionality when executed by processor 22. The modules include an operating system 15 that provides operating system functionality for system 10. The modules further include a UI wiring module 16 for providing user interface ("UI") wiring for a web portal, and all other functionality disclosed herein. System 10 can be part of a larger system, such as added functionality to the "WebCenter Portal" from Oracle Corp. Therefore, system 10 can include one or more additional functional modules 18 to include the additional functionality. A database 17 is coupled to bus 12 to provide centralized storage for modules 16 and 18.

As described, a portal is a website that is built using portal server software. Common features of a portal include the ability to include reusable user interface ("UI") components on pages and the ability for authorized users to build and configure the portal at runtime using a design UI that is part of the portal website itself. The reusable components include portlets conforming to portlet standards, such as those defined in the Java Portlet Specification 2.0 ("JSR 286"), portlets conforming to proprietary standards, and other reusable components created using other proprietary technologies. Some of these components may be located remote (e.g., on content provider 120) from the portal website that is generated on, for example, application server 110 of FIG. 1 and viewed on web browser 101. These components may be transported using an appropriate technology, such as Web Services for Remote Portlets ("WSRP") and aggregated into the portal by the portal software.

Known tools for generating and managing content related to portals, such as the "WebCenter Content" or "WebCenter Portal 11g", from Oracle Corp., include a variety of reusable components that provide access to the underlying content management system. For example, the WebCenter Portal from Oracle Corp. supports the following different types of reusable components: proprietary Application Development Framework ("ADF") task flows, standards-based WSRP portlets, and proprietary portlets. These different components can all be implemented as portlets, if desired, on the same portal page.

With portals, it is common for the reusable components to support some type of eventing system. A portlet event provides a powerful and flexible publish/subscribe mechanism for communication between portlets. Events are typically raised following a user interaction with the UI component. In turn, these events can be consumed by other UI components on the same portal. For example, one component might allow the selection of a value from a list of possible values. This could generate an event, with the selected value as the "payload" of the event. Other components on the portal page could then receive this event and use the payload value to change the data that it displays. Further, the components themselves may be remote from the portal and the events can be transmitted to those remote components for processing.

However, the disparate technologies used to implement the different types UI components that a portal is capable of aggregating together on the same page typically do not have directly compatible mechanisms for propagating events. Further, some event system components, such as ADF task flows, do not generate metadata that describes what events are published or consumed by those components, and the event payloads.

In contrast, embodiments provide wiring events between different types of components using an intuitive and easy to use user interface. Embodiments establish event metadata for events published and received for different types of UI components. With some types of component implementations that provide no metadata descriptions but generate events and receive events (e.g., ADF task flows), embodiments define and generate metadata in a form that is external to the components. For components that do published event metadata, such as WSRP portlets, embodiments allow the generated metadata to be used directly by other components.

Embodiments further provide a user interface that allow a user to define the logical mapping of events from event producing components to event consuming components that have been added to a page.

Embodiments further provide a central "Event Context." The central Event Context records the occurrences of all events being raised by all components on a portal page when a portal page is in use. Events from the implementation specific event systems of the various component types are captured and made available in a manner that is applicable to all of the types of components receiving events. For the WebCenter Portal embodiment, this is achieved by making the events and their payloads available via an Expression Language ("EL") expression.

Embodiments further allow for the UI components to be configured according to the logic event mapping defined in the UI, so that each component receives the required event information from the central Event Context. This is done in a manner that is specific to the UI component type. For the WebCenter Portal embodiment, this is done by providing the relevant Event Context expression language ("EL") expression, or "the EL", to the component in the relevant component specific way. The EL provides a mechanism for enabling a presentation layer (i.e., web pages) to communicate with an application logic (i.e., managed beans). The EL is used by both JavaServer Faces technology and JavaServer Pages ("JSP") technology. The EL represents a union of the expression languages offered by JavaServer Faces technology and JSP technology. In other embodiments in which the portal page is created and rendered using something other than JavaServer Faces, a different type of expression language can be used, such as Object-Graph Navigation Language ("OGNL")

As a result, for a web portal in accordance to embodiments of the invention, an event raised by a component is captured by the Event Context and delivered to the correct receiving component, as determined by the event wiring specified by the user via the UI.

Event Metadata

The assisted wiring in accordance with embodiments first surface metadata about events being raised by an event producing component. In one embodiment, the metadata definition for components includes the following:

A unique namespace describing all the events raised by the producer task flow.

Enumeration of properties that make up the event and is of interest to consumers of events. The "property-access-path" is relative to the payload of the event. Based on the value of this field, an EL expression is generated to access the "value" of the event property from the payload. If the entire payload needs to be considered, then there is no need to describe "event-properties" of the payload.

For components that declare event metadata in some form, this information can be derived from the published information. For components that do not declare this metadata, this is defined external to the component. For ADF task flows, for example, the metadata is defined by providing metadata that is specified in an XML file. An example of an XML file for defining metadata in accordance to one embodiment is as follows:

```
<pe-extension xmlns="http://xmlns.oracle.com/adf/pageeditor/extension">
<event-producer-config namespace="http://ns.oracle.com/category/HR">
    <event-producer task-flow-id="/WEB-INF/dept-browse-task-flow-definition.xml#dept-browse-task-flow-definition">
        <event-metadata event-name="DeptSelectedEvent" display-name="DepartmentSelected" description="This is event description">
            <event-properties>
                <event-property property-name="deptNo" property-access-path="deptNo" display-name="department-number" description="This is department number field"/>
            </event-properties>
        </event-metadata>
    </event-producer>
</event-producer-config>
</pe-extension>
```

Further, corresponding metadata information about the events consumed by components needs to be established in one embodiment. Specifically, the consuming task flow needs to register an interest with events raised by the producer task flow by subscribing to relevant namespaces. An example of this metadata information is as follows:

```
<pe-extension xmlns="http://xmlns.oracle.com/adf/pageeditor/extension">
<event-consumer-config namespace="http://ns.oracle.com/category/HR">
```

```
<event-consumer task-flow-id="/WEB-INF/employee-detail-task-flow-definition.xml#employee-detail-task-
flow-definition">
    <event-ref name="DeptSelectedEvent">
        <parameter-map>
            <param param-name="deptIdParam" event-property-name="deptNo"/>
        </parameter-map>
    </event-ref>
</event-consumer>
</event-consumer-config>
</pe-extension>
```

The consumer task flow as shown above (i.e., employee-detail-task-flow-definition) subscribes to a namespace http://ns.oracle.com/category/HR and registers interest in individual contextual events that might be raised by event producers registered in that namespace. If input parameters of the consuming task flow are not an exact match with event property names, a <parameter-map> element is authored to map individual input parameter names with event properties.

Event Wiring

Figure 3:
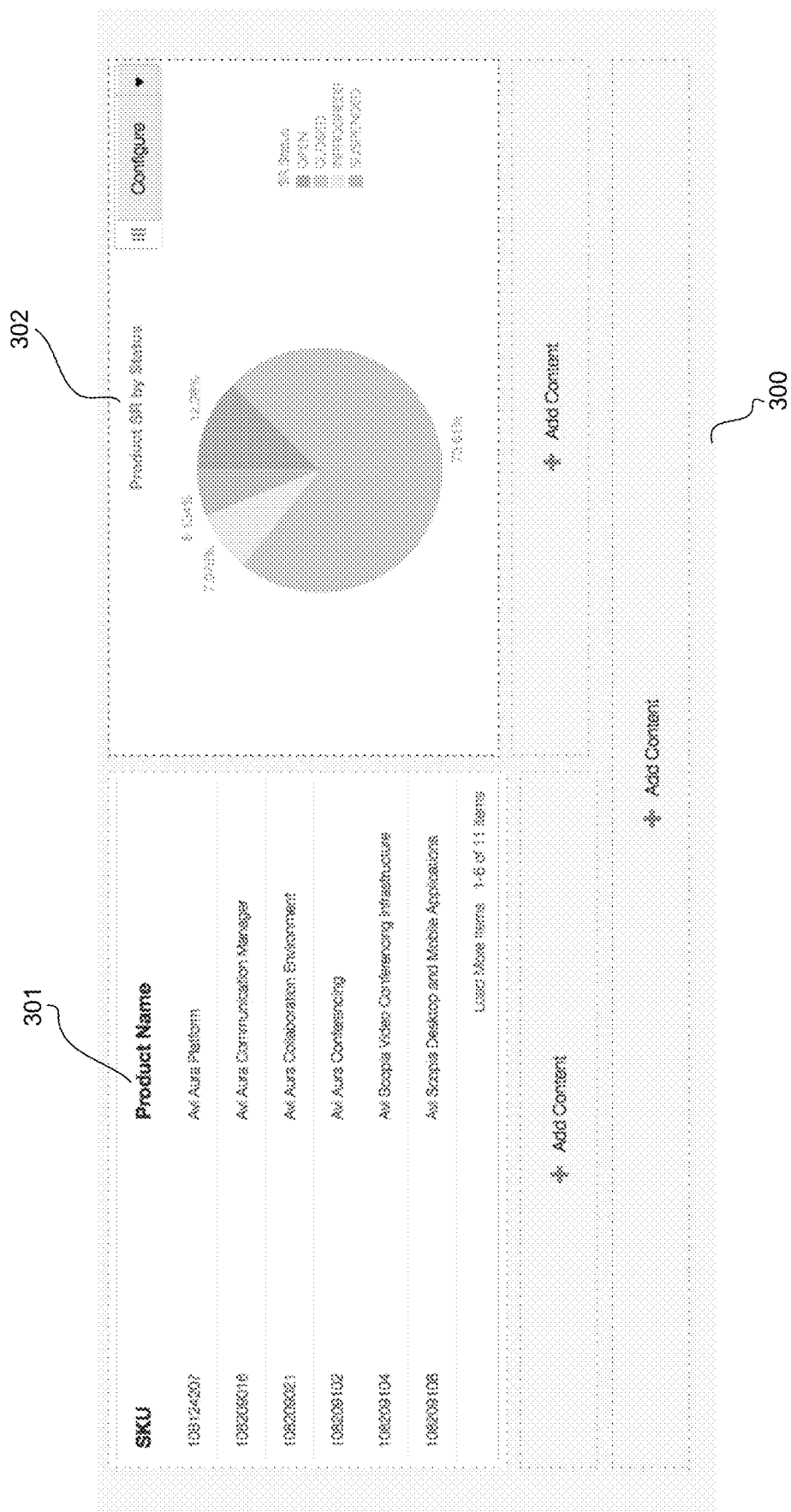
FIG. 3 is a screenshot showing a user interface for implementing event wiring in accordance with one embodiment.

In one embodiment, in order to implement the event wiring, a user begins editing a page and drags and drops producer and consumer components such as task flows or portlets onto a page. FIG. 3 is a screenshot 300 showing a user interface for implementing event wiring in accordance with one embodiment. As shown in the example of FIG. 3, two task flows 301, 302 have been added. The process of defining the event wiring then begins. At the beginning of this flow the definitions of the components are present on the page. In an ADF embodiment, these are recorded in PageDef.xml documents. This information is merged with the event metadata defined for the components and is cached for the lifetime of the editing session. This information is what is used to allow the component wiring UI to provide the correct event wiring choices to the user.

Figure 4:
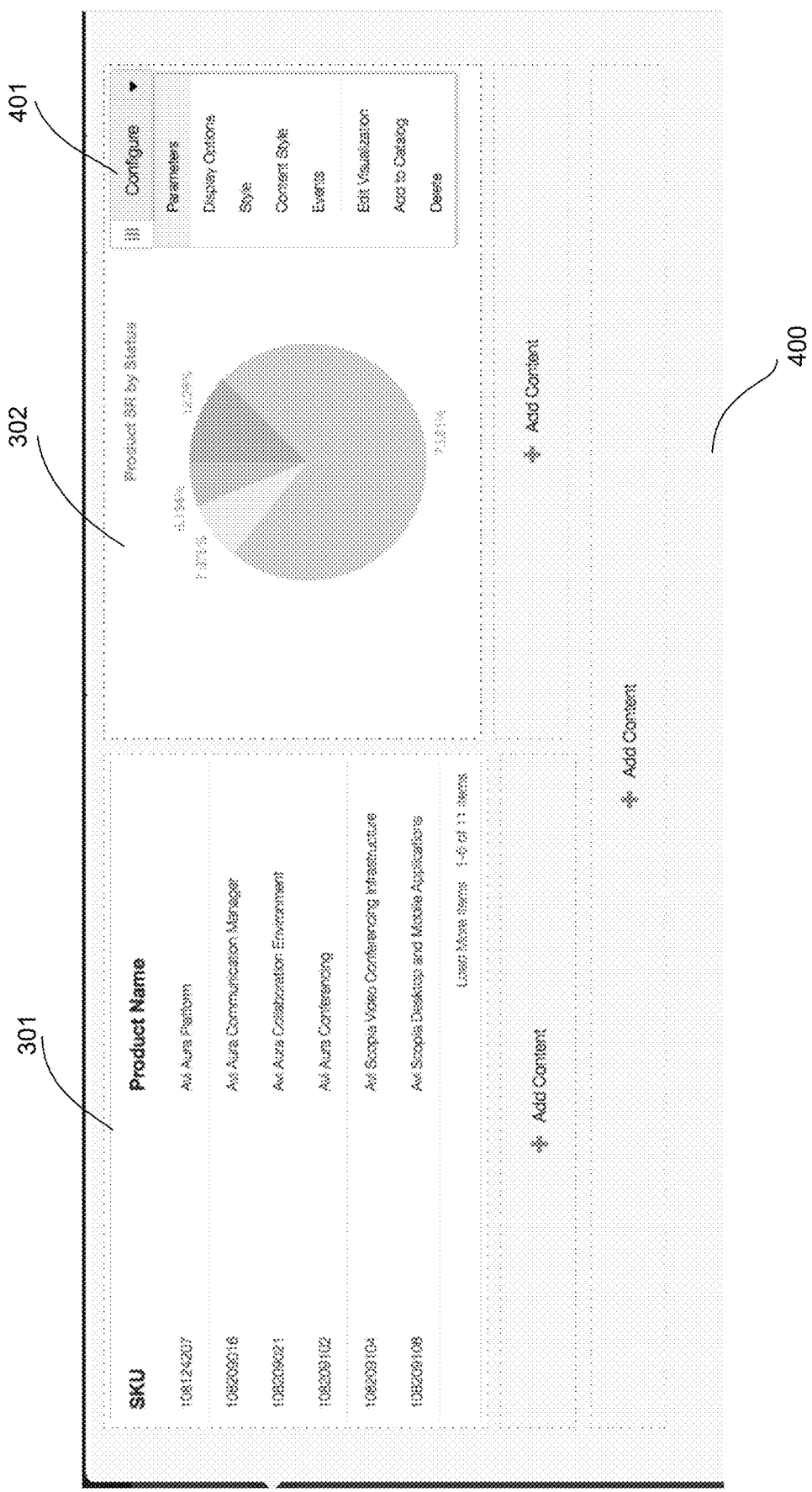
FIG. 4 is a screenshot showing a user interface for implementing event wiring in accordance with one embodiment.

FIG. 4 is a screenshot 400 showing a user interface for implementing event wiring in accordance with one embodiment. A user selects the "Configure" button 401 to bring up the "Parameter" panel of the "Product SR by Status" task flow 302

Figure 5:
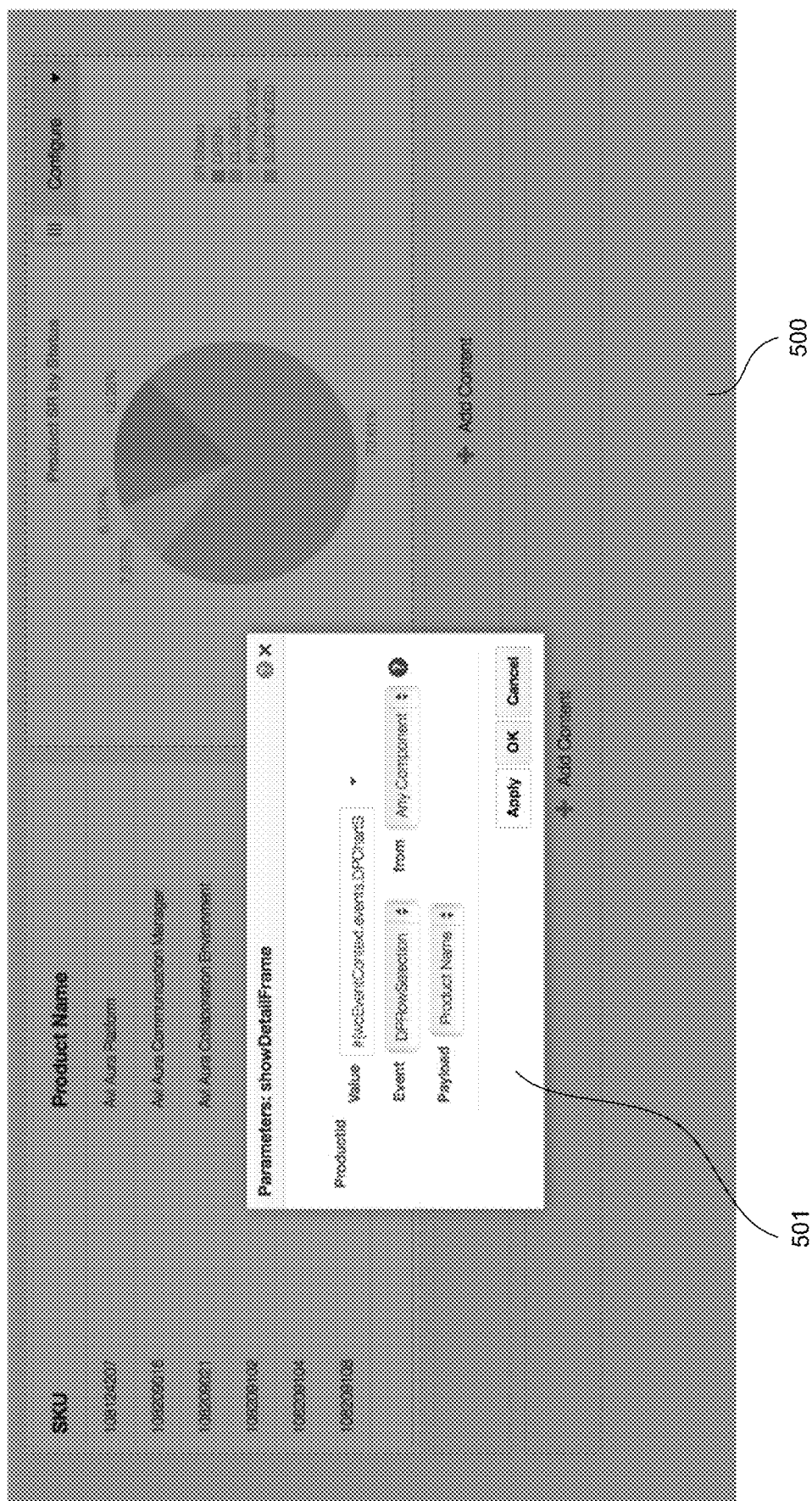
FIG. 5 is a screenshot showing a user interface for implementing event wiring in accordance with one embodiment.

FIG. 5 is a screenshot 500 showing a user interface for implementing event wiring in accordance with one embodiment. As shown, a parameter panel 501 provides the available "events" that can be wired to by interested consumer portlets. The different settings that can be done for a consumer to an event are shown in FIG. 5, and include:
  "Event": the Event available on the page;
  "from": the consumer can subscribe to an event raised by a specific or any component on the page. This setting indicates whether it is interested only in an event or producer/event on this page;
  "Payload": indicates the property of the event payload that the consumer is interested to wire the parameter "ProductId";
  Select "Apply" or "OK".

Screenshot 500 only shows one parameter (e.g., "ProductId") because the consumer component has been coded to expose only one parameter. However, each parameter can be wired to a different producer on the page (i.e., each consumer component on the page can wire with multiple task flow producer components). For example, embodiments can be used to create dashboards and wire it with different sources to show a consolidated picture.

Event Context

In one embodiment, the event context allows events from any source within the portal to be accessed in a uniform manner. In one embodiment, this involves being able to access a specific event or its payload via a Java expression language ("EL") expression. The EL provides a mechanism for enabling a presentation layer (e.g., web pages) to communicate with the application logic (e.g., managed beans). The EL is used by both JavaServer Faces ("JSF") technology and JavaServer Pages ("JSP") technology.

In one embodiment, this is achieved by having event listeners within all of the different event systems that are capable of observing all of the events raised within those systems. In the Webcenter Portal embodiment, this means observing ADF Model Contextual Events and Portlet Events.

When an event is raised, in one embodiment the details of the event, including the event payload, are captured in a short lived cache memory. The cache is tied to the current page being viewed, as the event wiring functionality only deals with events being delivered to components on the same page. In one embodiment, an EL Resolver is responsible for resolving various Event Context EL expressions. The specific details of the EL expression determine which event and its payload is returned.

The following illustrates some examples of the EL expressions in accordance with embodiments:
  Get the payload of the last event raised regardless of event name or producer:
    #{wcEventContext.lastEvent};
  Get the payload of the last event raised provided the event has name
    <eventName>:
      #{wcEventContext.lastNamed.<eventName>};
    (e.g., The EL #{wcEventContext.lastNamed.wcPersonSelected} will return the payload of the wcPersonSelected event if the wcPersonSelected was the last event raised in the current view, or null otherwise).
  Get the payload of the last event raised with name <eventName>:
    #{wcEventContext.events.<eventName>};
    (e.g., The EL #{wcEventContext.events.wcPersonSelected} will return the payload of the last wcPersonSelected event raised in the current view. If no event named wcPersonSelect has been raised since the current page has been active then this will return null).
  Get the payload of events by event producer:
    #{wcEventContext.producers.<producer>.<eventName>};
    (e.g., The EL
      #{wcEventContext.producers.PersonSelectTaskflow.wcPersonSelected} will return the payload of the last event named wcPersonSelected from the event producer named PersonSelectedTaskflow. If the producer does not exist or the named event has not been raised yet, then this EL will return null without producing raising an error).

Configure UI Components

Given the defined event wiring/mapping described above, and the Event Context that makes the events and their payloads available uniformly via EL expressions, embodiments then provide for configuring the UI components using those EL expressions. The implementation is specific to the type of the UI component. For ADF task flows, for example, this involves placing the relevant EL expression in an Extensible Markup Language ("XML") definition of the task flow binding that is used to include the task flow on the page. A sample configuration of a producer task-flow describing its events and payload properties that can be wired with a consumer task flow is as follows:

```
<pe-extension xmlns="http://xmlns.oracle.com/adf/pageeditor/extension">
<event-producer-config namespace="http://ns.oracle.com/category/HR">
    <event-producer task-flow-id="/WEB-INF/dept-browse-task-flow-definition.xml#dept-browse-task-flow-
definition">
        <event-metadata event-name="DeptSelectedEvent" display-name="DepartmentSelected"
description="This is event description">
            <event-properties>
                <event-property property-name="deptNo" property-access-path="deptNo" display-name="department-
number" description="This is department number field"/>
            </event-properties>
        </event-metadata>
    </event-producer>
</event-producer-config>
</pe-extension>
```

Figure 6:
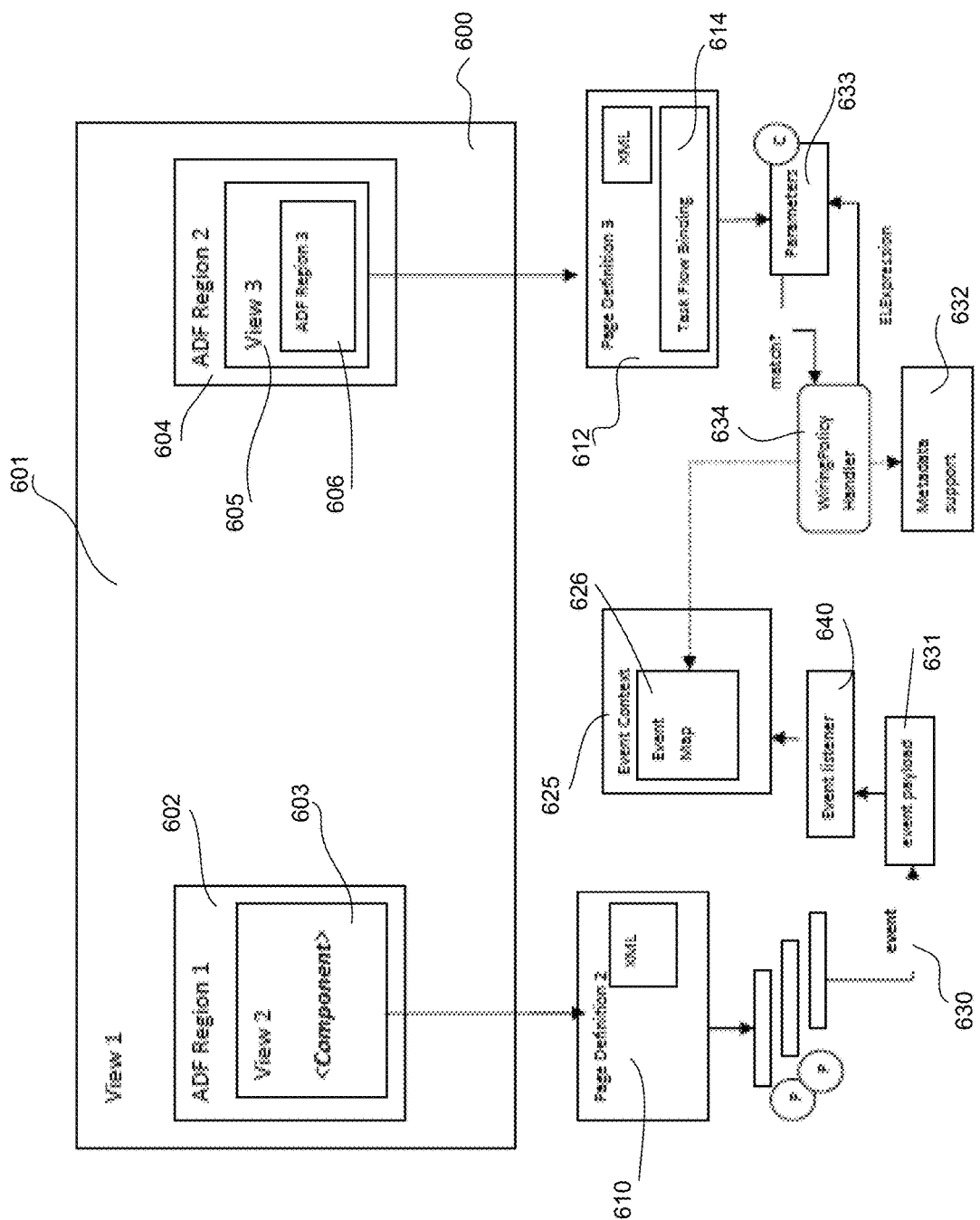
FIG. 6 is a block diagram of a portal page and underlying event wiring in accordance with one embodiment.

FIG. 6 is a block diagram of a portal page 600 and underlying event wiring in accordance with one embodiment. As described, FIG. 6 shows the wiring of contextual events raised within a view, with components having input parameters that can be bound to events payloads driven by an externally defined metadata. In one embodiment, an event listener 640 is defined to catch all contextual events being raised from a page and persist it in a context that can be EL accessible for the lifetime of the page.

Portal page 600 in one embodiment is logically comprised of a view definition and a page definition. The view definition contains syntax that describes what is actually going to be seen on the page. The page definition defines model objects that the view definition syntax can refer to and which can be used when the page is being rendered out. The reusable components are included in the pages by entries in these view definitions. Further, for ADF Task Flows, these reusable components can have one or more view definitions or "views" containing syntax describing the content that will be presented via the browser for that component.

Portal page 600 includes three views 601, 603, 605. Page 600 further includes three ADF regions 602, 604, 606. View 603 includes a reusable component (e.g., a JSF UI component) having an associate page definition 610 formed of an XML file, and view 605 includes a reusable component having an associated page definition 612 formed of an XML file. The reusable component of view 603 is an ADF task flow component, and includes associated task flow binding 614. A "P" indicates a producer component, and a "C" indicates a consumer component.

During runtime, when an event is raised at 630, a global call-back handler registered with the ADF model ("ADFm")

event dispatcher (not shown) populates an event map 626 having view scope with event details and its corresponding payload 631.

When a task flow having input parameters is dropped into a page, metadata 632 about contextual events and its subscribed producers are referred to for eventual wiring of parameters with event payloads. Further, when a task flow having input parameters is dropped into a page, if there are task flows already on the page capable of delivering events whose payload matches the design pattern of the task flow just dropped, then it is a candidate for auto wiring, saving the business user the need to understand or comprehend the process.

A custom ADFm Event Dispatcher is registered with ADFm that invokes registered listeners whenever any ADFm contextual event is raised. These listeners are configured in a servlet filter located at:

```
<ADE_ROOT>/wpfas/modules/adfm-eventdispatcher/
src/java/oracle/webcenter/framework/event/dispatcher/EventDispatcherFilter.java
public void init(FilterConfig filterConfig){
// Register our common event calbacks.
HashSet<String> callbackClasses = new HashSet<String>(2);
// Register the EventContext callback with all CallbackEventDispatchers
callbackClasses.add("oracle.webcenter.framework.event.EventContextCallback");
// other code
}
```

The callback classes are registered with the custom ADFm EventDispatcher in the filter's init method. The callback class has a method called "eventDispatched( )" to handle the raised contextual event as follows:

```
public void eventDispatched(Event event, EventDefinition eventDef,
EventDispatcher dispatcher, DCBindingContainer bindingContainer) {
EventContext eventContext = EventContext.getCurrentInstance( );
eventContext.put(event);
}
```

An event handler method 634 gets an EventContext instance from the current viewScope and saves the event in the context. This context is then EL accessible from the naming context #{wcEventContext}. The following table shows various ways in which events and some of its properties are EL accessible:

| | |
|---|---|
| #{wcEventContext.lastEvent} | get the payload of the last event raised regardless of event name or producer |
| #{wcEventContext.events.<event name>} | get the payload of the last event with a given name |
| #{wcEventContext.producers.<producer>.<eventName> | get payload of events by event producer |
| #{wcEventContext.regions.<region>.<producer>.<eventName> | |

Figure 7:
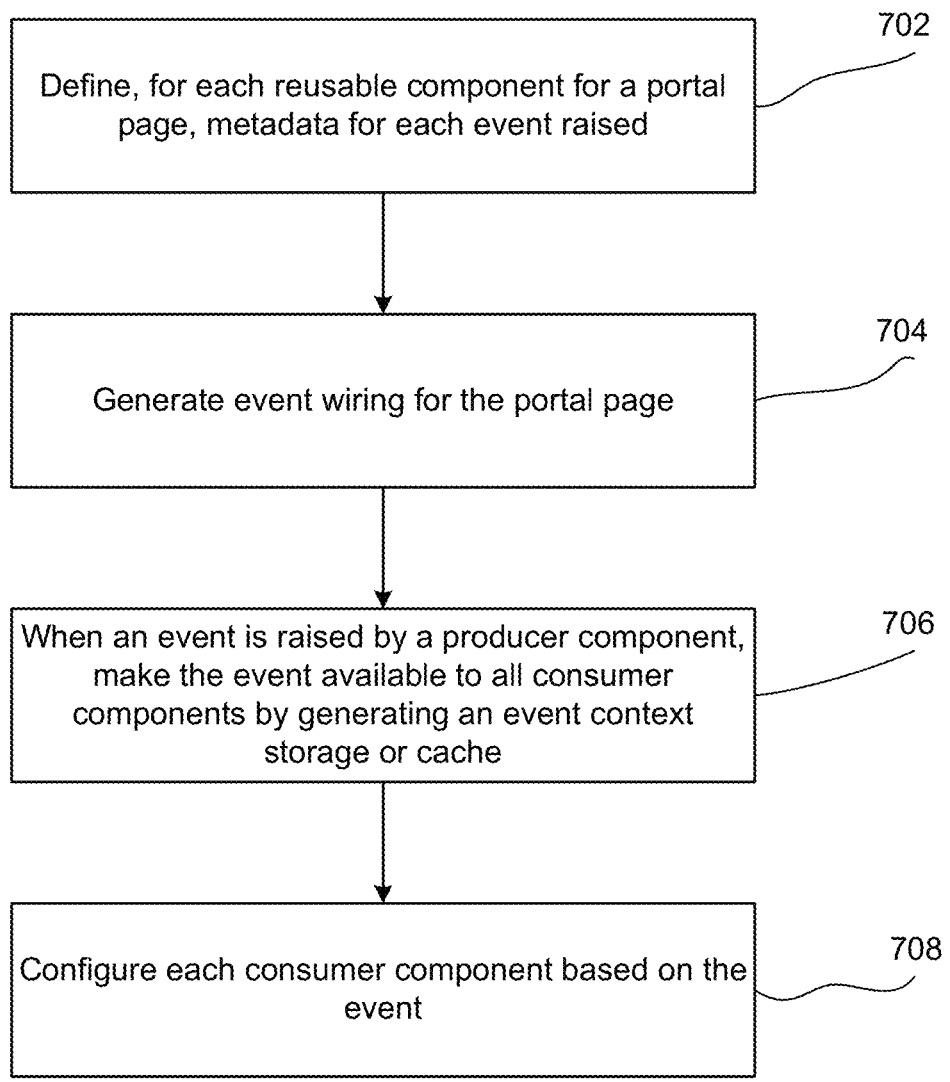
FIG. 7 is a flow diagram of the functionality of UI wiring module of FIG. 2 for providing UI wiring for a web portal in accordance with one embodiment of the present invention.

FIG. 7 is a flow diagram of the functionality of UI wiring module 16 of FIG. 2 for providing UI wiring for a web portal in accordance with one embodiment of the present invention. In one embodiment, the functionality of the flow diagrams of FIG. 7 is implemented by software stored in memory or other computer readable or tangible medium, and executed by a processor. In other embodiments, the functionality may be performed by hardware (e.g., through the use of an application-specific integrated circuit ("ASIC"), a programmable gate array ("PGA"), a field programmable gate array ("FPGA"), etc.), or any combination of hardware and software.

At 702, for each reusable component for a portal page, metadata is defined for each event raised. The reusable components include portlets conforming to portlet standards, such as JSR 286, portlets conforming to proprietary standards, and other reusable components created using other proprietary technologies. The metadata definition includes a unique namespace describing all events, and an enumeration of properties that make up the event. In one embodiment, the portal page is created and rendered using JavaServer Faces.

At 704, event wiring for the portal page is generated. The event wiring in one embodiment is generated using a user interface such as shown in FIGS. 3-5 above. The event wiring defines which events generated by producer components are of interest to consumer components.

At 706, when an event is raised by a producer component, the event is made available to all consumer components by generating an event context storage or cache. In one embodiment, each event is stored and described using an EL expression or other type of expression.

At 708, each consumer component is configured based on the event using the EL expressions or other type of expressions defined at 706.

As disclosed, embodiments generate web portals by defining metadata for events raised by reusable components. The events can be stored in a central location or listener and made available to all consumer components. The consumer components can be configured based on the events. Therefore, contextual events raised within a view with components having input parameters can be wired and bound to events payloads driven by the externally defined metadata. Further, the listener stores all contextual events being raised from a page and persist it in a context that can be accessible (e.g., EL accessible) for the lifetime of the page.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A non-transitory computer readable medium having instructions stored thereon that, when executed by a processor, cause the processor to generate a portal web site that comprises a plurality of reusable components, the generating comprising:

defining, for each reusable component, event metadata, wherein at least one of the reusable components is a task flow component, and the event metadata is defined for each task flow component in a data file external to the task flow component, and at least one of the reusable components is a portlet component that generates its own event metadata, wherein a portlet component is not a task flow component;

generating event wiring for the portal web site used to communicate event metadata, wherein the event wiring includes one or more mappings established among a plurality of the reusable components of the portal website that comprise at least one task flowcomponent and at least one portlet component, and at least a portion of the mappings are received from a user interacting with a user interface for configuring the portal web site;

configuring one or more external files for one or more task flowcomponents, wherein the one or more configured external files define at least one event property for producing event data or at least one event property for consuming event data;

observing, by event listeners, an event being raised by a producer component, and capturing event payload data for the raised event, wherein, the event listeners are configured to observe Application Development Framework ("ADF") Model contextual events raised by a producer task flow component and Portlet events raised by a producer portlet component, and the event listeners are configured to observe events that are raised within a current view of a page of the portal website;

in response to the raised event, making the raised event available to consumer components on the portal web site after persisting an instance of the raised event in a central event context storage that records occurrences of events raised by task flow components and portlet components of the portal web site when the portal web site is in use, wherein instances of the observed events that are raised within the current view of the page of the portal website are persisted in the central event context storage for a lifetime of the page, and the central event context storage is configured to return payload data for a persisted event in response to an expression that requests the payload data; and configuring one or more consumer components based on the raised event, one or more expressions that request payload data from the central event context storage, and the mappings established among the plurality of reusable components.

2. The computer readable medium of claim 1, wherein the central event context storage is configured to return payload data for a persisted event in response to an expression language (EL) expression, and the configuring of the one or more consumer components based on the raised event comprises using the EL expression.

3. The computer readable medium of claim 1, wherein the metadata comprises a unique namespace describing all events, and an enumeration of properties that make up the event.

4. The computer readable medium of claim 1, wherein the portal web site is created and rendered using JavaServer Faces, and the one or more external files that define event metadata for task flow components are Extensible Markup Language (XML) files.

5. The computer readable medium of claim 1, wherein an external file for a consumer task flow component is configured to include a mapping between one or more event properties and one or more parameters for the consumer task flow component.

6. The computer readable medium of claim 1, wherein one or more configured external files for one or more task flowcomponents include EL expressions for retrieving payload data persisted at the central event context storage.

7. The computer readable medium of claim 1, wherein the at least one portlet component that generates its own event metadata comprises a Web Service for Remote Portlets (WSRP) component.

8. The computer readable medium of claim 1, wherein event metadata for ADF Model contextual events is defined in the one or more external files for the one or more task flow components, and event metadata for Portlet events is declared by the producer portlet component.

9. The computer readable medium of claim 8, wherein a raised ADF Model contextual event is persisted in the central event context storage based on an ADF Model event dispatcher registered with the ADF Model.

10. The computer readable medium of claim 1, wherein an expression resolver is configured to resolve a received expression, and the central event context storage is configured to return payload data for one or more specific persisted events based on parameters for the resolved expression, the parameters for the resolved expression comprising one or more of a naming context, an event name, or a producer component name.

11. A method of generating a portal web site that comprises a plurality of reusable components, the method comprising:
defining by a processor, for each reusable component, event metadata, wherein at least one of the reusable components is a task flow component, and the event metadata is defined for each task flow component in a data file external to the task flow component, and at least one of the reusable components is a portlet component that generates its own event metadata, wherein a portlet component is not a task flow component;
generating, by the processor, event wiring for the portal web site used to communicate event metadata, wherein the event wiring includes one or more mappings established among a plurality of the reusable components of the portal website that comprise at least one task flow component and at least one portlet component, and at least a portion of the mappings are received from a user interacting with a user interface for configuring the portal web site;
configuring one or more external files for one or more task flowcomponents, wherein the one or more configured external files define at least one event property for producing event data or at least one event property for consuming event data;
observing, by event listeners, an event being raised by a producer component, and capturing event payload data for the raised event, wherein the event listeners are configured to observe Application Development Framework ("ADF") Model contextual events raised by a producer task flow component and Portlet events raised by a producer portlet component, and the event listeners are configured to observe events that are raised with in a current view of a page of the portal website;
in response to the raised event, making the raised event available to consumer components on the portal web site after persisting an instance of the raised event in a central event context storage that records occurrences of events raised by task flow components and portlet components of the portal web site when the portal web site is in use, wherein instances of the observed events that are raised within the current view of the page of the portal website are persisted in the central event context storage for a lifetime of the page, and the central event context storage is configured to return payload data for a persisted event in response to an expression that requests the payload data; and
configuring one or more consumer components based on the raised event, one or more expressions that request payload data from the central event context storage, and the mappings established among the plurality of reusable components.

12. The method of claim 11, wherein the central event context storage is configured to return payload data for a persisted event in response to an expression language (EL) expression, and the configuring of the one or more consumer components based on the raised event comprises using the EL expression.

13. The method of claim 11, wherein the metadata comprises a unique namespace describing all events, and an enumeration of properties that make up the event.

14. The method of claim 11, wherein the portal web site is created and rendered using JavaServer Faces, and the one or more external files that define event metadata for task flowcomponents are Extensible Markup Language (XML) files.

15. A system for generating a portal web site that comprises a plurality of reusable components, the system comprising:
a processor coupled to a storage medium that comprises instructions, the processor, upon executing the instructions:
defines event metadata for each reusable component, wherein at least one of the reusable components is a task flow component, and the event metadata is defined for each task flow component in a data file external to the task flow component, and at least one of the reusable components is a portlet component that generates its own event metadata, wherein a portlet component is not a task flow component,
generates event wiring for the portal web site used to communicate event metadata, wherein the event wiring includes one or more mappings established among a plurality of the reusable components of the portal website that comprise at least one task flow component and at least one portlet component, and at least a portion of the mappings are received from a user interacting with a user interface for configuring the portal web site;
configures one or more external files for one or more task flow components, wherein the one or more configured external files define at least one event property for producing event data or at least one event property for consuming event data;

observes, using event listeners, an event being raised by a producer component, and capturing event payload data for the raised event, wherein the event listeners are configured to observe Application Development Framework ("ADF") Model contextual events raised by a producer task flow component and Portlet events raised by a producer portlet component, and the event listeners are configured to observe events that are raised within a current view of a page of the portal website;

in response to the raised event, makes the raised event available to consumer components on the portal web site after persisting an instance of the raised event in a central event context storage that records occurrences of events raised by task flow components and portlet components of the portal web site when the portal web site is in use, wherein instances of the observed events that are raised within the current view of the page of the portal website are persisted in the central event context storage for a lifetime of the page, and the central event context storage is configured to return payload data for a persisted event in response to an expression that requests the payload data; and configures one or more consumer components based on the raised event, one or more expressions that request payload data from the central event context storage, and the mappings established among the plurality of reusable components.

16. The system of claim 15, wherein the central event context storage is configured to return payload data for a persisted event in response to an expression language (EL) expression, and the configuring of the one or more consumer components based on the raised event comprises using the EL expression.

17. The system of claim 15, wherein the metadata comprises a unique namespace describing all events, and an enumeration of properties that make up the event.

18. The system of claim 15, wherein the portal web site is created and rendered using JavaServer Faces, and the one or more external files that define event metadata for task flowcomponents are Extensible Markup Language (XML) files.

* * * * *

UNITED STATES PATENT AND TRADEMARK OFFICE
CERTIFICATE OF CORRECTION

PATENT NO. : 10,860,186 B2
APPLICATION NO. : 14/749792
DATED : December 8, 2020
INVENTOR(S) : Jena et al.

It is certified that error appears in the above-identified patent and that said Letters Patent is hereby corrected as shown below:

In the Specification

In Column 4, Line 40, delete "reusuable" and insert -- reusable --, therefor.

In Column 6, Line 11, delete "("OGNL")" and insert -- ("OGNL"). --, therefor.

In Column 7, Line 40, delete "302" and insert -- 302. --, therefor.

In Columns 9-10, Line 38, delete "calbacks." and insert -- callbacks. --, therefor.

In the Claims

In Column 12, Line 26, in Claim 1, delete "flowcomponent" and insert -- flow component --, therefor.

In Column 12, Line 32, in Claim 1, delete "flowcomponents," and insert -- flow components, --, therefor.

In Column 13, Line 19, in Claim 6, delete "flowcomponents" and insert -- flow components --, therefor.

In Column 13, Line 64, in Claim 11, delete "flowcomponents," and insert -- flow components, --, therefor.

In Column 14, Line 9, in Claim 11, delete "with in" and insert -- within --, therefor.

In Column 14, Line 41, in Claim 14, delete "flowcomponents" and insert -- flow components --, therefor.

In Column 16, Line 20, in Claim 18, delete "flowcomponents" and insert -- flow components --, therefor.

Signed and Sealed this
Twenty-fifth Day of May, 2021

Drew Hirshfeld
*Performing the Functions and Duties of the*
*Under Secretary of Commerce for Intellectual Property and*
*Director of the United States Patent and Trademark Office*